United States Patent [19]

Wun

[11] Patent Number: 5,452,120
[45] Date of Patent: Sep. 19, 1995

[54] LAMP SHADE MOVING MECHANISM FOR TRANSPARENCY SCANNINGS

[75] Inventor: Jeffrey Wun, Hsinchu, Taiwan

[73] Assignee: Umax Data Systems Inc., Hsinchu, Taiwan

[21] Appl. No.: 254,941

[22] Filed: Jun. 7, 1994

[51] Int. Cl.⁶ .............................................. G02B 26/02
[52] U.S. Cl. ..................................... 359/230; 358/474; 355/71
[58] Field of Search ............... 359/196, 227, 230, 892, 359/554; 355/71, 228, 229, 67; 358/506, 509, 510, 475, 494, 497, 461, 483, 487, 474

[56] References Cited

U.S. PATENT DOCUMENTS 4,908,717  3/1990  Natori ................................ 358/497

*Primary Examiner*—Ricky D. Shafer
*Assistant Examiner*—James Phan
*Attorney, Agent, or Firm*—W. Wayne Lianh

[57] ABSTRACT

A lamp shade moving mechanism for transparency scanning includes a guiding rack, a sliding block, a driving motor and a belt. Grooves are formed on inside wall of two lateral sides of guiding rack to hold and lead sliding block. Driving motor and belt move sliding block to make a linear to-and-fro movement along guiding rack. A lamp shade is disposed on the sliding block, characterized by having simple components and capable of performing high speed scanning.

11 Claims, 5 Drawing Sheets

LAMP SHADE MOVING MECHANISM FOR TRANSPARENCY SCANNINGS

BACKGROUND OF THE INVENTION

Optical scanner has been widely used in recent years as an input device for image and graphic documents. The diversity of input documents increases constantly. A specially designed optical scanner for transparency is also available now (referring to FIG. 1). Comparing with a conventional optical scanner, there are some major differences which will be described more detailed below.

Light source is disposed in an upper case (10), transparency (11) is placed on a transparent glass (13) of base frame (12) wherein a CCD circuit is held. The movable light source projecting light rays from top downward and transmitting image signals of transparency (11) to CCD circuit in base frame (12). In a conventional optical scanner for hardcopy documents, both light source and CCD circuit are disposed inside of base frame (12).

In a conventional base frame (12) set forth above, the driving mechanism of a movable light source usually adopts a guiding-rod approach (referring to FIG. 2), lamp shade (14) is driven by a driving motor (16) and a belt (17), and makes a linear and reciprocal motion for scanning operation along two guiding frames (15) having been disposed at two lateral sides of base frame (12). The lamp shade moving mechanism set forth above which has been used in conventional optical scanner or copier cannot produce desirable result when applying to a transparency scanner. The reasons and constraints is set forth below.

Firstly, conventional lamp shade moving mechanism consists of many complex components, difficult to maintain or repair, and is costly to produce. Secondly, substantial amount of power and driving torque generated by driving motor would be used to overcome the friction resistance of guiding frame (15), thus makes it difficult to increase the moving speed of the lamp shade moving mechanism, subsequently would not be suitable for a high-speed scanner.

SUMMARY OF THE INVENTION

It is accordingly an object of the present invention to provide a lamp shade moving mechanism for transparency scanning use.

The present invention particularly contemplates to employ a guiding-rack structure to replace conventional guiding-rod approach, using guiding racks and a sliding block with rollers driven by a motor and cog-belt to achieve high speed and long range movement of a lamp shade.

It is another object of the present invention to provide a lamp shade moving mechanism with simply structured components and can be produced with low cost.

Additional objects and advantages of the present invention are made apparent in the following description having reference to the accompanying drawings.

DESCRIPTION OF THE PREFERRED EMBODIMENT

Figure 1:
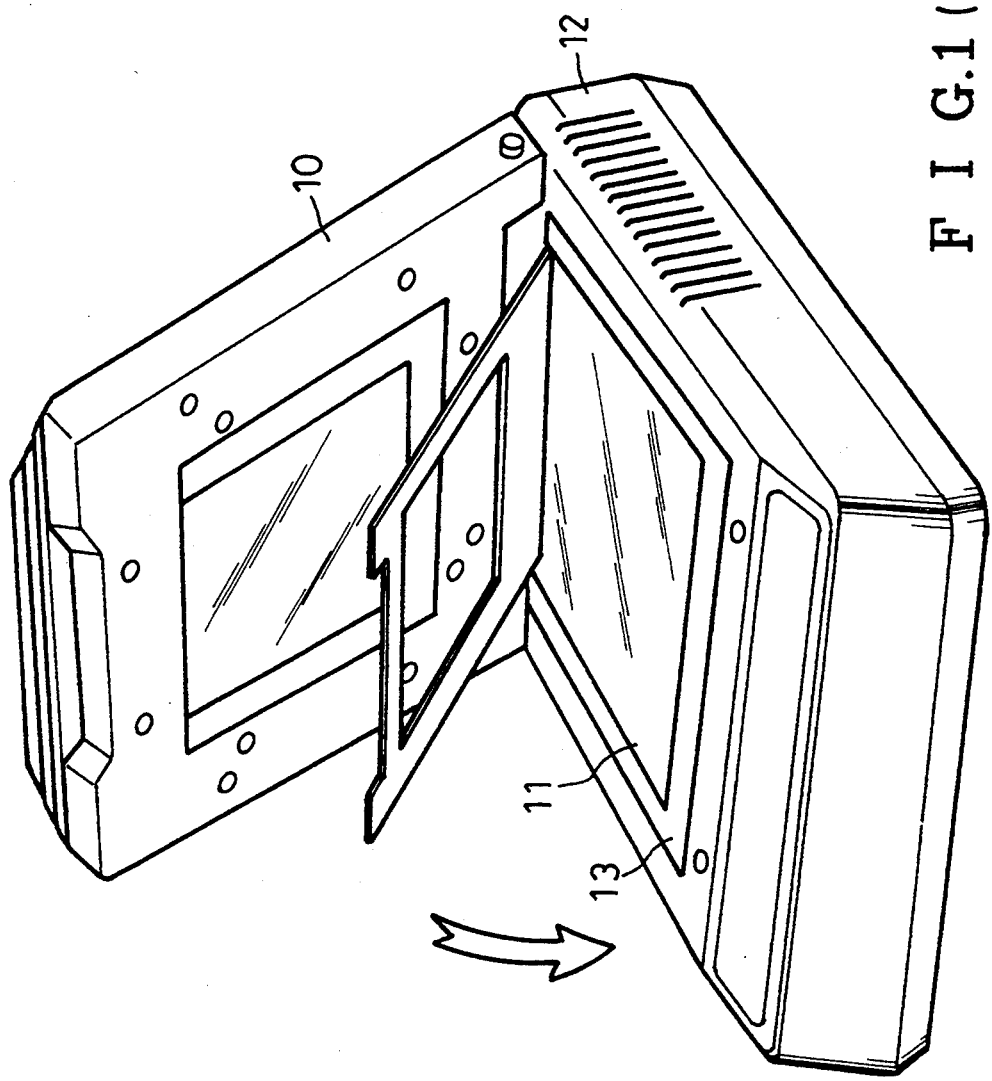
FIG. 1 is a perspective view of an optical scanner for transparency.
Figure 2:
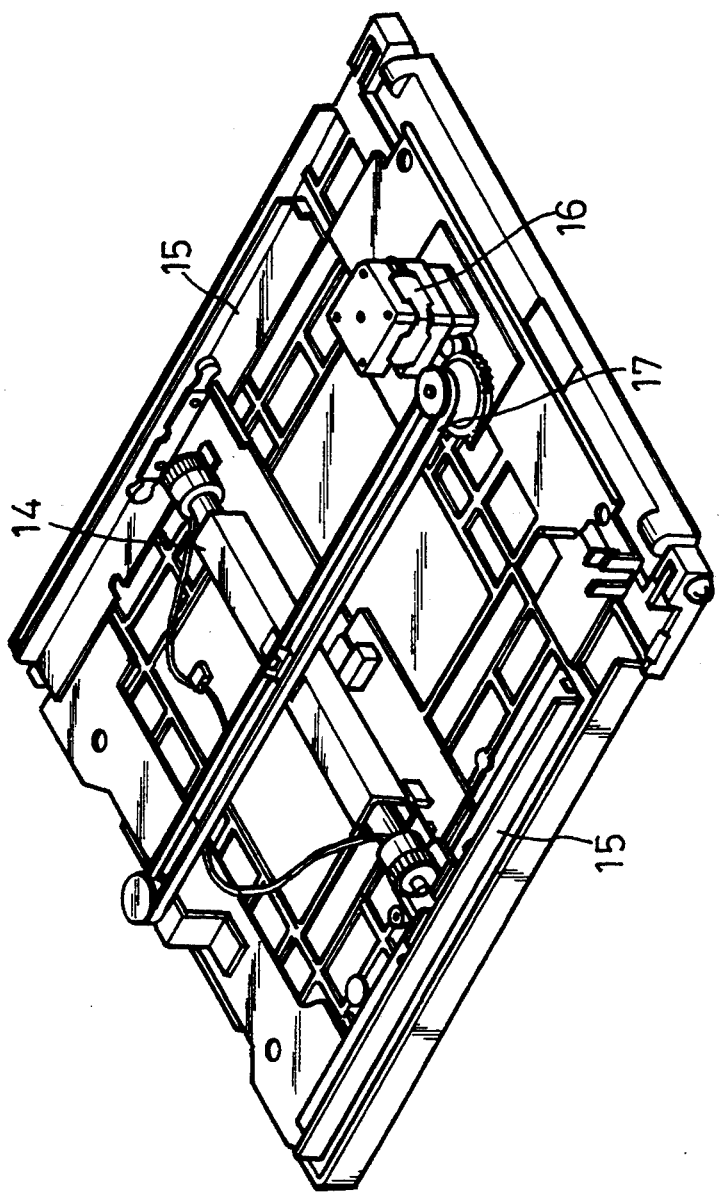
FIG. 2 is a perspective view illustrates the structure of a conventional lamp shade moving mechanism.
Figure 3:
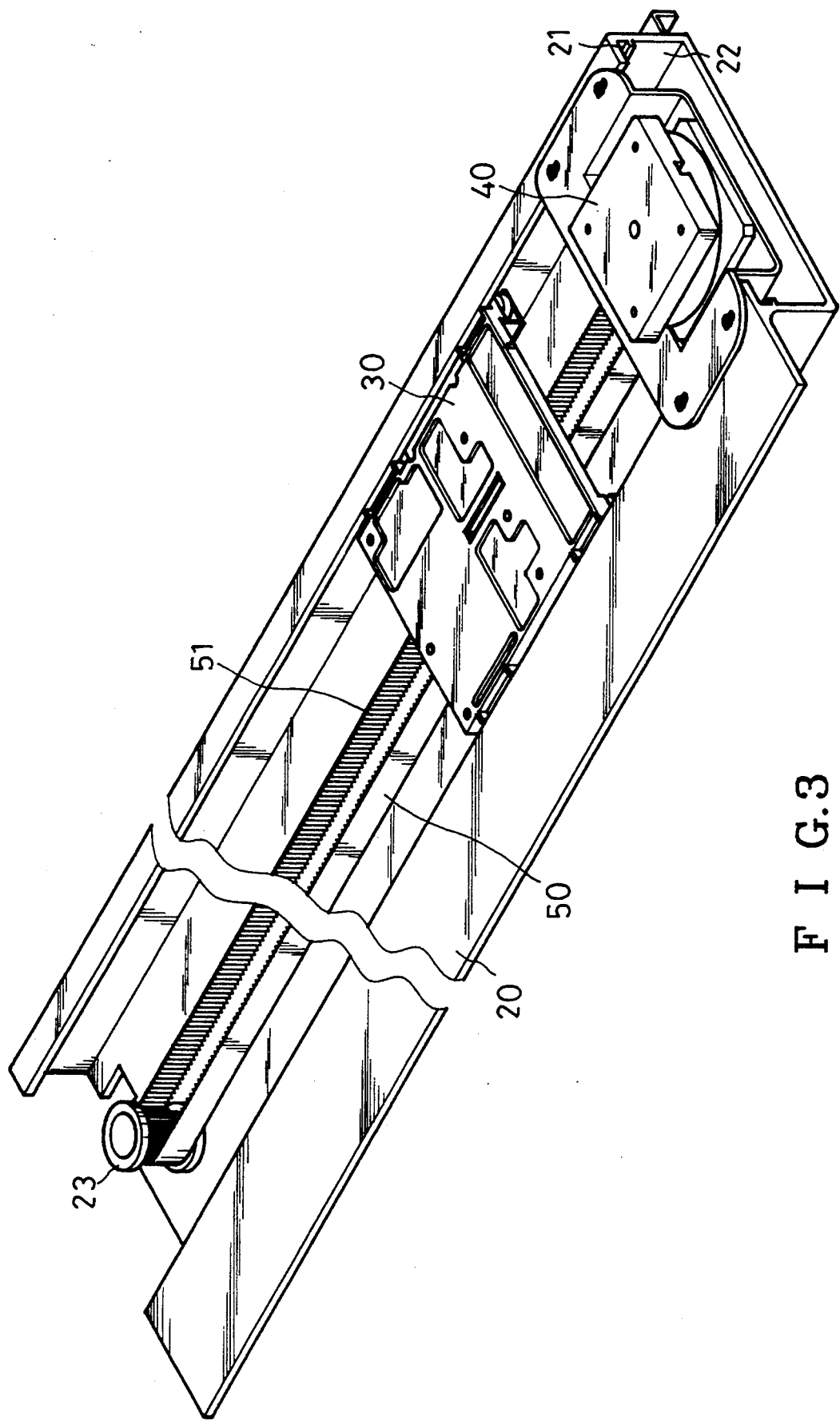
FIG. 3 is a perspective view of a preferred embodiment of the present invention.

Referring to FIG. 3, a preferred embodiment of the present invention comprising a guiding rack (20), a sliding block (30), a driving motor (40) and a cog belt (50), Guiding rack (20) is a lengthy channel and is formed with a generally "U" shape crosssection. Two longitudinal grooves have been formed respectively on the inside wall of each lateral side of guiding rack (20), including a holding groove (21) on the top and a sliding groove (22) being disposed below. A driving motor (40) is disposed at one end of guiding rack (20) and an idler (23) is disposed at the other end of guiding rack (20). A close loop cog belt (50) engages driving motor (40) with idler (23).

Figure 4:
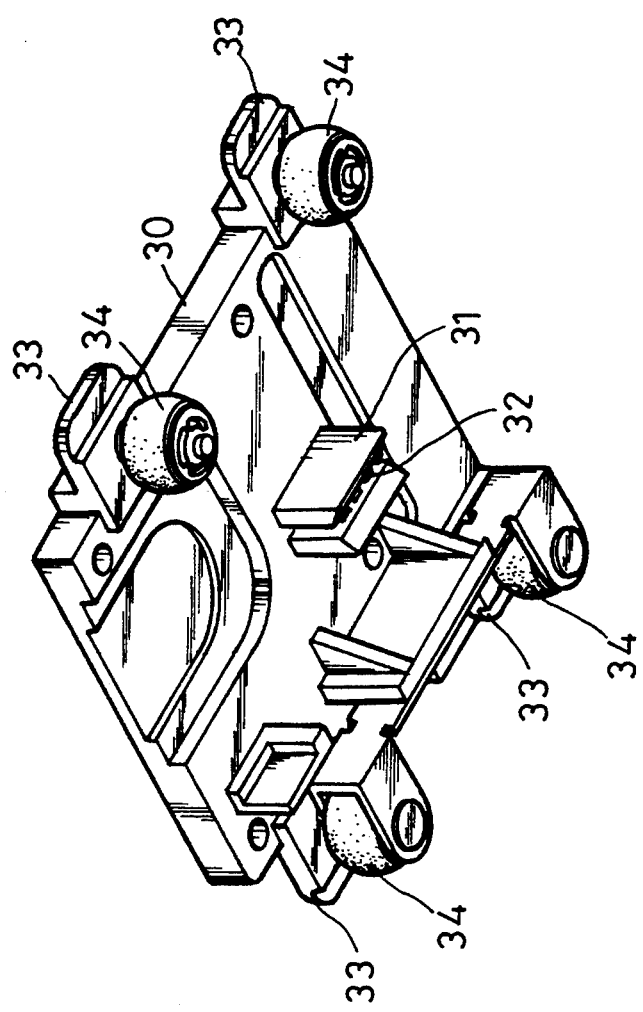
FIG. 4 is a perspective view of a preferred embodiment of the present invention illustrates a sliding block.

Referring to FIG. 4, an extruded belt clamp (31) is disposed under bottom surface of sliding block (30) and with a teeth slot (32) being formed therein. Teeth slot (32) engages tightly with cog belt. Therefore when driving motor (40) is activated and drives cog belt (50) to make a linear to-and-fro movement between driving motor (40) and idler (23), belt clamp (31) and sliding block (30) will also be moved to-and-fro linearly between driving motor (40) and idler (23).

Sliding block (30) has four corners. A protrusive latch (33) is disposed at each corner and engages with a holding groove (21) on guiding rack (20). A roller (34) is disposed under a protrusive latch (33) and engages with a sliding groove (22) on guiding rack (20). Both convex latch (33) and roller (34) can slide to-and-fro respectively in a holding groove (21) and sliding groove (22). Protrusive latch (33) is to stabilize the sliding block (30) when it is moving. Roller (34) is to keep sliding block (30) moves easily along guiding rack (20).

Figure 5:
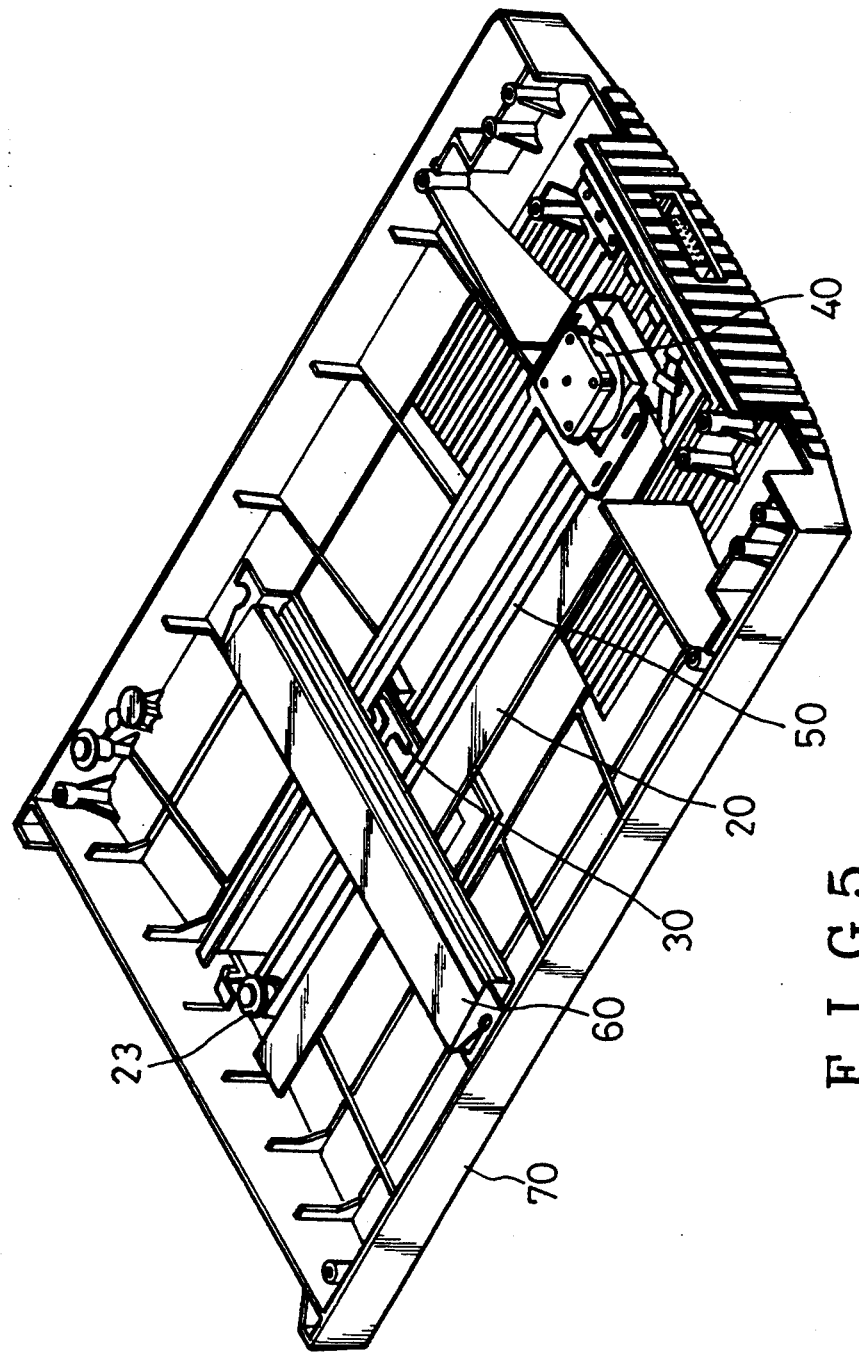
FIG. 5 is a cutaway view of a preferred embodiment of the prefect invention illustrates an operative status.

Referring to FIG. 5, lamp shade (60) is disposed on on sliding block (30). Thus when driving motor (40) drives sliding block (30) to make a linear to-and-fro movement, lamp shade (60) and the lamp therein will also be moved to-and-fro linearly within cover plate (70).

In summary, the present invention contemplates to employ a simple guiding-rack structure as a means to drive a lamp shade in a transparency scanner. Besides having a simple structure, it also has smaller number of components than conventional scanner, thus can reduce product cost and assembly time and efforts. Furthermore the sliding mechanism of the present invention needs less driving torque, therefore can be adopted for high speed scanning and long scanning distance for larger size scanning object. It is to be understood that the description and preferred embodiments set forth above are only to serve for illustrative purpose, and do not intend to limit the scope of the present invention. Various changes and modifications may be made without departing from the scope of the present invention.

What is claimed is:

1. A lamp shade moving mechanism for transparency scanning, comprising a guiding rack, a sliding block, a belt, and a driving unit, said sliding block having a lamp shade disposed thereon, said guiding rack having grooves formed respectively on an inside wall of its two lateral sides, said driving unit being constructed so as to move said belt and subsequently driving said sliding block to make a linear to-and-fro movement along said grooves on said guiding rack;

wherein said sliding block further having a protrusive latch and a roller disposed respectively on each of its four corners.

2. A lamp shade moving mechanism for transparency scanning of claim 1 wherein said grooves on said guiding rack comprising a holding groove and a sliding groove.

3. A lamp shade moving mechanism for transparency scanning of claim 1 wherein said driving unit being disposed at one end of said guiding rack.

4. A lamp shade moving mechanism for transparency scanning of claim 3 wherein said driving unit being a motor.

5. A lamp shade moving mechanism for transparency scanning of claim 3 wherein said guiding rack having an idler disposed at another end, said driving unit moving said belt to make a to-and-fro movement with said idler as an ending point.

6. A lamp shade moving mechanism for transparency scanning, comprising a guiding rack, a sliding block, a belt, and a driving unit, said sliding block having a lamp shade disposed thereon, said guiding rack having grooves formed respectively on an inside wall of its two lateral sides, said driving unit being constructed so as to move said belt and subsequently driving said sliding block to make a linear to-and-fro movement along said grooves on said guiding rack;

wherein said sliding block further having an extruded belt clamp with a teeth slot formed therein which is disposed under its bottom surface.

7. A lamp shade moving mechanism for transparency scanning of claim 6 wherein said belt, which is driven by said driving unit, engages with said belt clamp.

8. A lamp shade moving mechanism for transparency scanning of claim 7 wherein said belt having teeth-shaped grooves formed thereon and engaging with said belt clamp.

9. A lamp shade moving mechanism for transparency scanning of claim 6 wherein said driving unit being disposed at one end of said guiding rack.

10. A lamp shade moving mechanism for transparency scanning of claim 9 wherein said driving unit is a motor.

11. A lamp shade moving mechanism for transparency scanning of claim 9 wherein said guiding rack having an idler disposed at another end, said driving unit moving said belt to make a to-and-fro movement with said idler as an ending point.

* * * * *